US011689923B2

(12) United States Patent
Bakshi et al.

(10) Patent No.: US 11,689,923 B2
(45) Date of Patent: *Jun. 27, 2023

(54) METHOD AND SYSTEM FOR GENERATING A SECURE ONE-TIME PASSCODE USING STRONG AUTHENTICATION

(71) Applicant: ZUMIGO, INC., San Jose, CA (US)

(72) Inventors: Chirag C. Bakshi, San Jose, CA (US); Harish Manepalli, San Jose, CA (US); Venkatarama Parimi, Dublin, CA (US); Desmond Kwok-Hon Chan, San Jose, CA (US)

(73) Assignee: ZUMIGO, INC., San Jose, CA (US)

( * ) Notice: Subject to any disclaimer, the term of this patent is extended or adjusted under 35 U.S.C. 154(b) by 130 days.

This patent is subject to a terminal disclaimer.

(21) Appl. No.: 17/141,643

(22) Filed: Jan. 5, 2021

(65) Prior Publication Data
US 2021/0211876 A1 Jul. 8, 2021

Related U.S. Application Data

(60) Provisional application No. 62/957,773, filed on Jan. 6, 2020.

(51) Int. Cl.
H04W 12/06 (2021.01)
H04L 9/40 (2022.01)
H04W 12/033 (2021.01)

(52) U.S. Cl.
CPC ....... H04W 12/068 (2021.01); H04L 63/0435 (2013.01); H04L 63/0838 (2013.01); H04W 12/033 (2021.01)

(58) Field of Classification Search
CPC ............. H04W 12/068; H04W 12/033; H04L 63/0435; H04L 63/0838; H04L 63/18
See application file for complete search history.

(56) References Cited

U.S. PATENT DOCUMENTS 9,641,505 B2 * 5/2017 Neuman ................. H04L 63/18
10,623,961 B1 * 4/2020 Manepalli ............ H04W 12/06
10,764,752 B1 * 9/2020 Avetisov ............... H04L 63/062
(Continued)

FOREIGN PATENT DOCUMENTS

WO  2015/021392 A1  2/2015
WO  2018/174901 A1  9/2018

OTHER PUBLICATIONS

International Search Report and Written Opinion dated Apr. 12, 2021 in corresponding International Application No. PCT/US2021/012174, 9 pages.

Primary Examiner — J. Brant Murphy
(74) Attorney, Agent, or Firm — Kim & Stewart LLP

(57) ABSTRACT

An authentication server enrolls a user's mobile device as a trusted device with a vendor software after verifying the network ID of the user's mobile device. The authentication server associates the network ID in an authentication entry with authentication information such as a push notification token and cryptographic key. Later, when the user attempts to log in to the vendor software, the authentication server may attempt to cryptographically authenticate the user. Otherwise, the authentication server may use the push notification token to transmit an OTP to the user's mobile device as a push notification.

20 Claims, 6 Drawing Sheets

(56) References Cited

U.S. PATENT DOCUMENTS

| | | | | |
|---|---|---|---|---|
| 2012/0311686 A1* | 12/2012 | Medina | | H04L 63/0823 |
| | | | | 726/7 |
| 2015/0106900 A1* | 4/2015 | Pinski | | H04W 12/068 |
| | | | | 726/7 |
| 2015/0237031 A1* | 8/2015 | Neuman | | H04L 67/02 |
| | | | | 713/176 |
| 2015/0237049 A1* | 8/2015 | Grajek | | H04L 67/02 |
| | | | | 726/7 |
| 2015/0249617 A1* | 9/2015 | Chang | | H04L 67/303 |
| | | | | 709/225 |
| 2016/0112410 A1* | 4/2016 | Nedeltchev | | H04L 63/0876 |
| | | | | 713/156 |
| 2016/0149873 A1* | 5/2016 | Dickinson | | G06F 21/64 |
| | | | | 713/171 |
| 2018/0285552 A1* | 10/2018 | Oberheide | | H04L 63/08 |
| 2018/0295514 A1* | 10/2018 | Brown | | H04W 12/069 |
| 2019/0052629 A1* | 2/2019 | Manepalli | | H04L 63/0853 |
| 2020/0067922 A1* | 2/2020 | Avetisov | | H04L 63/18 |
| 2020/0245142 A1* | 7/2020 | Manepalli | | H04L 63/102 |
| 2021/0044976 A1* | 2/2021 | Avetisov | | H04L 9/321 |

\* cited by examiner

METHOD AND SYSTEM FOR GENERATING A SECURE ONE-TIME PASSCODE USING STRONG AUTHENTICATION

CROSS-REFERENCE TO RELATED APPLICATION(S)

This application claims the benefit of U.S. Provisional Patent Application No. 62/957,773, filed Jan. 6, 2020, which is herein incorporated by reference in its entirety.

BACKGROUND

It has become common practice for multi-factor authentication to be required before allowing a user to log in to an account or a website. For example, when logging in to a bank account via an application on a smartphone, a user may be required to confirm his or her identity via two-factor authentication. The user may be required to enter a user password followed by a one-time passcode (OTP) that is received via text message on a mobile phone linked to the bank account. In this way, authentication of the user is contingent on both a knowledge factor (knowledge of the user password) and a possession factor (possession of the mobile phone linked to the bank account).

However, two-factor authentication using OTP sent by text messaging can be problematic because text messages are not always reliably received by a targeted mobile device in a timely manner. Additionally, a fraudster may receive the OTP if the fraudster hijacked the user's mobile phone number. For example, the fraudster may have convinced a service agent of the user's mobile operator to activate the user's mobile number on the fraudster's phone. Such a scheme is common and is known as subscriber identity module (SIM) hijacking, SIM kidnapping, and account takeover.

Technologies have been developed that determine a mobile number of a mobile device when a user uses the mobile device to log in to an account or a website. Specifically, a mobile network carrier may identify a subscriber's mobile number when data traffic from the subscriber's mobile device travels on the carrier's data network. Once identified, the mobile number can be used as an authentication factor to secure an online transaction in place of sending an OTP via a text message. However, a fraudster may still use SIM hijacking to authenticate the fraudster's device once the fraudster's device becomes associated with the subscriber's mobile number. Consequently, like sending an OTP via a text message, merely using a mobile number to authenticate the user may be subject to fraud.

SUMMARY

According to one or more embodiments, a user's mobile device is enrolled as a trusted device with a vendor software after verification of the network identification (ID) of the mobile device. A network ID may be, e.g., a mobile directory number (MDN) or a mobile identification number (MIN). After enrollment, the network ID is associated with authentication information such as a push notification token and a cryptographic key. Later, when the user attempts to log in to the vendor software, the costs of transmitting an OTP may be avoided if the cryptographic key can be used to authenticate the mobile device. Otherwise, the push notification token may be used to transmit an OTP to the device as a push notification instead of as a text message. Unlike a text message, a push notification is transmitted to a mobile device via a mapping to an application or web browser installed on the device. Because the OTP is transmitted as a push notification, a fraudster will not receive the OTP by merely performing SIM hijacking.

A computer-implemented method of authenticating a user device to securely log in to a vendor software includes receiving a request to enroll the user device as a trusted device with the vendor software, the request to enroll the user device including a first network ID of the user device and other authentication information; determining that the first network ID is associated with the user device; upon determining that the first network ID is associated with the user device, enrolling the user device as a trusted device with the vendor software by storing the first network ID and the other authentication information; after enrolling the user device, receiving a request to authenticate the user device as a trusted device, the request to authenticate the user device including a second network ID of the user device; comparing the first network ID to the second network ID; and upon determining that the first network ID matches the second network ID, using the other authentication information to authenticate the user device as a trusted device that may securely log in to the vendor software.

Further embodiments include a restricted-access system configured to carry out the above computer-implemented method.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope. The invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1A:
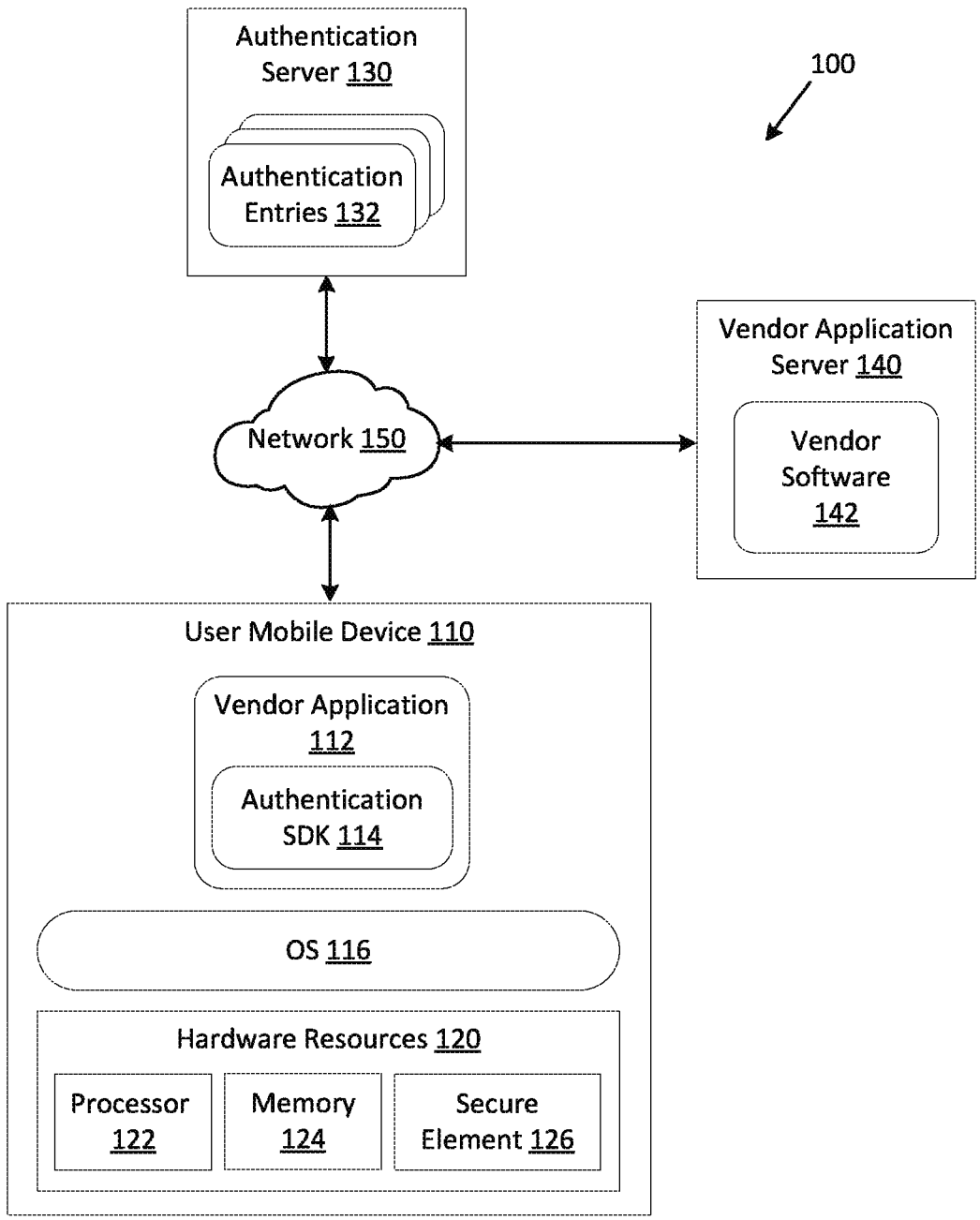
FIG. 1A is a block diagram of a wireless communication system that uses a cryptographic key or secure OTP to authenticate a user for a vendor, according to an embodiment.

FIG. 1A is a block diagram of a wireless communication system 100 that uses a cryptographic key or secure OTP to authenticate a user for a vendor, according to an embodiment. Such authentication may be referred to as "strong authentication." A user may opt in to strong authentication with a vendor in order to enhance security and reduce fraud. Wireless communication system 100 comprises a user mobile device 110, an authentication server 130, and a vendor application server 140 that communicate over a network 150.

Network 150 may be, e.g., a wireless local area network (WLAN) that includes one or more devices based on the Institute of Electrical and Electronics Engineers (IEEE) 802.11 standard. Network 150 may also be, e.g., a cellular network that includes one or more base stations (not shown) that are in two-way wireless communication with mobile devices and with a landline system (not shown), such as the public switched telephone network (PSTN) or any other wired network capable of voice/data connections.

Vendor application server 140 is a server that hosts an online service for a vendor such as a bank or an electronic commerce (e-commerce) business. Vendor application server 140 provides the online service via a vendor software 142. Vendor software 142 may be, e.g., a website that user mobile device 110 interacts with to use the online service.

User mobile device 110 may be any mobile device that is configured to allow a user to wirelessly access network 150 and to practice one or more embodiments. User mobile device 110 may be, e.g., a cellphone, smartphone, personal digital assistant (PDA), tablet computer, or laptop computer.

User mobile device 110 includes hardware resources 120. Hardware resources 120 comprise a processor 122, memory 124, and secure element 126. Processor 122 may be, e.g., a central processing unit (CPU), an application-specific integrated circuit (ASIC), a field-programmable gate array (FPGA), or a combination of processing units. Memory 124 may include, e.g., random-access memory (RAM), read-only memory (ROM), flash memory, a magnetic hard drive, etc. Secure element 126 is a portion of hardware resources 120 that is inaccessible to devices outside of user mobile device 110. Secure element 126 may be, e.g., a trusted platform module (TPM). Hardware resources 120 also comprise storage (not shown), e.g., a hard disk drive (HDD) or a solid-state drive (SSD).

User mobile device 110 has installed therein a vendor application 112 and an operating system (OS) 116. OS 116 supports the functions of processor 122, including scheduling tasks, initiating the execution of applications, managing sockets and transmission control protocol (TCP) connections, generating cryptographic keys, etc.

Vendor application 112 is a computer program designed to run on user mobile device 110 and to facilitate interactions with vendor software 142. For example, if vendor software 142 is provided by a bank, then vendor application 112 is an application that user mobile device 110 uses to access the user's bank account.

Vendor application 112 is embedded with an authentication software development kit (SDK) 114. Authentication SDK 114 is a package that performs authentication functions for vendor application 112. The performing of authentication functions by authentication SDK 114 will be discussed further below.

Authentication server 130 is a server that provides authentication services for vendors including for the vendor of vendor application server 140. Authentication server 130 provides such authentication services when the user chooses to enroll user mobile device 110 as a trusted device with vendor software 142. After enrollment, authentication server 130 provides such authentication services each time the user attempts to log in to his or her account with vendor software 142.

If network 150 is a cellular network, authentication server 130 analyzes a header of a data packet transmitted by mobile device 110 across network 150 to determine the network ID of user mobile device 110. On the other hand, if network 150 is a WLAN, authentication server 130 instructs user mobile device 110 to transmit a data packet over a separate cellular network operated by a cellular network provider. Authentication server 130 then analyzes a header of the data packet transmitted over the cellular network to determine the network ID. Identifying a network ID for a device that is connected to either a cellular network or a WLAN is disclosed in U.S. patent application Ser. No. 16/102,624, filed Aug. 13, 2018, the entire contents of which are incorporated by reference.

For the user to enroll user mobile device 110 as a trusted device with vendor software 142, authentication server 130 also monitors the user's network ID for recent high-risk events. For example, high-risk events may include a recent change in the mobile device activated with the network ID or a recent change in the SIM card associated with the network ID. Detection of such changes is disclosed in U.S. patent application Ser. No. 16/262,811, filed Jan. 30, 2019, the entire contents of which are incorporated by reference.

Additional examples of high-risk events include a change in a user name for a mobile account associated with the network ID, a change in an address for such a mobile account, a change in a number of identity verification queries that have been performed with respect to the network ID, etc. Detection of such changes is disclosed in U.S. Pat. No. 10,623,961, filed Dec. 11, 2018, the entire contents of which are incorporated by reference. All of the above high-risk events generally occur prior to fraudulent activity. As such, the occurrence of such events should be considered before allowing the user to enroll user mobile device 110 as a trusted device with vendor software 142.

When the user decides to enroll user mobile device 110 as a trusted device, authentication SDK 114 generates a push notification token. The push notification token is mapped to vendor application 112. User mobile device 110 then transmits a request to authentication server 130 to enroll user mobile device 110 as a secure device with vendor software 142. The request includes a network ID that the user asserts to be associated with user mobile device 110. The request also includes the push notification token.

When authentication server 130 receives the request to enroll user mobile device 110, authentication server 130 analyzes a header of a data packet transmitted by user mobile device 110 to determine whether the asserted network ID is actually associated with user mobile device 110. However, if such a data packet is not available, authentication server 130 instead transmits an OTP as a text message to the asserted network ID. When user mobile device 110 receives the OTP, user mobile device 110 transmits the OTP back to authentication server 130, proving that the asserted network ID is actually associated with user mobile device 110. Upon determining that the asserted network ID is actually associated with user mobile device 110, authentication server 130 may also determine if any high-risk events have recently occurred with respect to the asserted network ID. Such recent high-risk events may show that the asserted network ID is compromised and that a fraudster is attempting to enroll his or her own mobile device as a secure device with vendor software 142.

Upon a determination that the asserted network ID is actually associated with user mobile device 110 and that high-risk events have not recently occurred, authentication server 130 stores the asserted network ID and the push notification token as an authentication entry 132. Each authentication entry may thus be, e.g., a tuple that includes a network ID and push notification token that are associated with each other.

In addition to a push notification token, when the user decides to enroll user mobile device 110 as a trusted device, authentication SDK 114 may also instruct OS 116 to generate a cryptographic key (or a pair of cryptographic keys). For example, OS 116 may generate a key pair, consisting of a public key and a private key. OS 116 stores the private key in secure element 126 and returns the public key to authentication SDK 114. User mobile device 110 may then include the cryptographic key received by authentication SDK 114 in the request to enroll user mobile device 110 as a trusted device. Authentication server 130 may then include the cryptographic key in the user's authentication entry 132. Each authentication entry may thus be, e.g., a tuple that includes a network ID, a push notification token, and a cryptographic key that are all associated with each other.

After the user enrolls user mobile device 110 as a trusted device with vendor software 142, the user may later log in to his or her account with vendor software 142 by proving possession of user mobile device 110. If user mobile device 110 transmits a login request to vendor application server 140, vendor application server 140 transmits a request to authentication server 130 to authenticate the user. The authentication request includes a network ID that is associated with the user's account.

When authentication server 130 receives the authentication request, authentication server 130 compares the requested network ID to the network IDs of each authentication entry 132 in authentication server 130. If authentication server 130 cannot find such an authentication entry 132, then authentication server 130 transmits a message to vendor application server 140 indicating that no device associated with the requested network ID has enrolled as a trusted device. If authentication server 130 does find such an authentication entry 132, then authentication server 130 checks if the authentication entry 132 includes a cryptographic key.

If the authentication entry 132 does include a cryptographic key, then authentication server 130 attempts to authenticate user mobile device 110 cryptographically. Such cryptographic authentication is discussed below in conjunction with FIG. 3. If cryptographic verification succeeds, then authentication server 130 may transmit a message to vendor application server 140 indicating that user mobile device 110 is trusted and may thus be allowed to log in without additional authentication factors. However, if authentication entry 132 does not include a cryptographic key or if cryptographic verification fails, then authentication server 130 attempts to authenticate user mobile device 110 using the push notification token of authentication entry 132. Such push-notification authentication is discussed below in conjunction with FIG. 4.

In the embodiment of FIG. 1A, the push notification token is mapped to vendor application 112. When authentication server 130 transmits an OTP, it transmits the OTP to the push notification token which is received by a provider of OS 116 on which vendor application 112 is installed. The provider of OS 116 then routes the OTP to vendor application 112 via a push notification channel. The user then receives the OTP as a push notification, and the user can enter the OTP through a user interface (UI) of vendor application 112. User mobile device 110 can then transmit the entered OTP to vendor application server 140 as proof that the login request was transmitted by a trusted device. Vendor application server 140 may then allow the user to log in to his or her account.

In the embodiment described herein, an OTP is transmitted as a type of push notification known as a non-interactive push notification. In other embodiments, an interactive push notification may be used to prove possession of a trusted device. An interactive push notification provides the user an opportunity to respond to the push notification. For example, a user may respond "yes" or "no" to an interactive push notification that asks whether or not the user attempted to log in to his or her bank account. Responding "yes" may then allow user mobile device 110 to access the account, while responding "no" may prevent such access.

A user may install multiple applications on user mobile device 110, each application being embedded with an authentication SDK. In such an embodiment, the user may enroll user mobile device 110 as a trusted device with multiple vendors. Authentication server 130 may then include a separate authentication entry 132 for multiple vendor application servers, each authentication entry 132 being tied to the same network ID. To enroll user mobile device 110 as a trusted device for multiple applications, each authentication SDK generates a push notification token that is mapped to the application that the authentication SDK is embedded in. Additionally, if authentication entries 132 include cryptographic keys, each authentication SDK instructs OS 116 to generate a cryptographic key (or pair of cryptographic keys). User mobile device 110 transmits the different push notification tokens (and cryptographic keys) to authentication server 130 for storage in authentication entries 132. Thus, while each of the user's authentication entries 132 may be tied to the same network ID, each may contain a different push notification token (and a different cryptographic key) for an associated application. Then, when a vendor application server transmits a request to authentication server 130 to authenticate the user, authentication server 130 may locate the authentication entry 132 of the user corresponding to the requesting vendor.

A user may also enroll multiple mobile devices as trusted devices with vendor software 142, each mobile device being tied to the same network ID. Authentication server 130 then stores a separate authentication entry 132 for each device. Each authentication entry 132 contains the same network ID but a different push notification token (and a different cryptographic key if the authentication entries 132 include cryptographic keys). Later, when authentication server 130 receives an authentication request from vendor application server 140, authentication server 130 may then authenticate using either device.

Figure 1B:
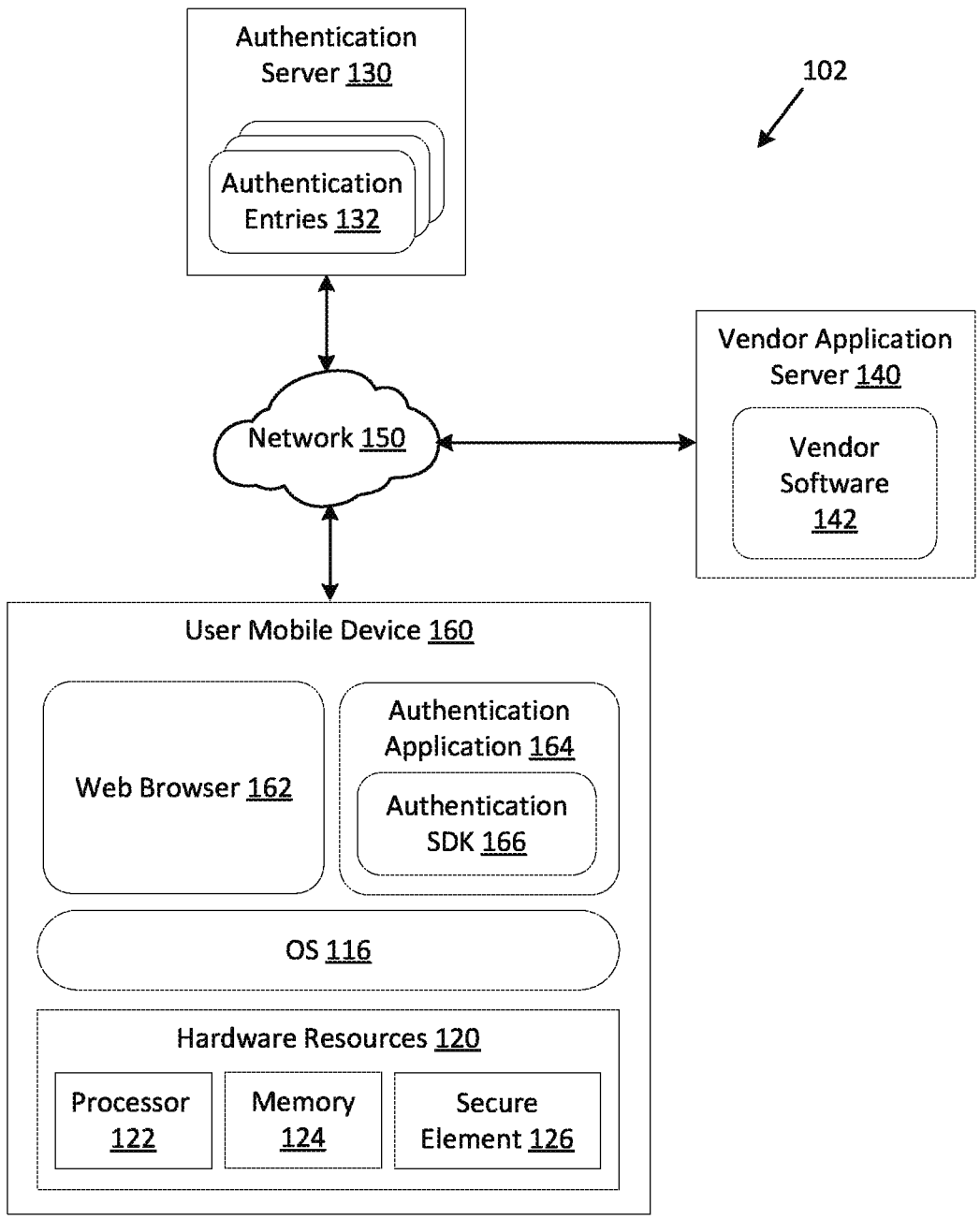
FIG. 1B is a block diagram of a wireless communication system that uses a cryptographic key or secure OTP to authenticate a user for a vendor, according to another embodiment.

FIG. 1B is a block diagram of a wireless communication system 102 that uses a cryptographic key or secure OTP to authenticate a user for a vendor, according to another embodiment. Wireless communication system 102 comprises a user mobile device 160, an authentication server 130, and a vendor application server 140 that communicate over a network 150.

Like user mobile device 110 from FIG. 1A, user mobile device 160 may be any mobile device that is configured to allow a user to wirelessly access network 150 and to practice one or more embodiments. User mobile device 160 may be, e.g., a cellphone, smartphone, PDA, tablet computer, or laptop computer.

However, unlike user mobile device 110 from FIG. 1A, user mobile device 160 has installed therein a web browser 162 and an authentication application 164. Web browser 162 is a software that allows the user of user mobile device 160 to access network 150. In the embodiment of FIG. 1B, the user uses web browser 162 to interact with vendor software 142 instead of using a vendor application. For example, if vendor software 142 is a website provided by a bank, then the user interacts with the website via web browser 162.

Authentication application 164 is a software application embedded with an authentication SDK 166. Like vendor application 112 from FIG. 1A, authentication application 164 uses its embedded SDK to perform authentication functions. However, unlike vendor application 112 from FIG. 1A, authentication application 164 is not designed to facilitate interactions with vendor software 142. Authentication application may instead be a security application.

In wireless communication system 102, when the user enrolls user mobile device 160 as a trusted device with vendor software 142, the resulting authentication entry 132 includes a push notification token that is mapped to authentication application 164. As such, when the user attempts to log in to his or her account, if user mobile device 160 cannot be authenticated cryptographically, authentication server 130 transmits a secure OTP to authentication application 164 as a push notification.

As shown by the embodiment of FIG. 1B, the application that is used for receiving a secure OTP does not need to be an application that was designed for accessing vendor software 142. The user can receive a secure OTP, e.g., from a security application.

Figure 1C:
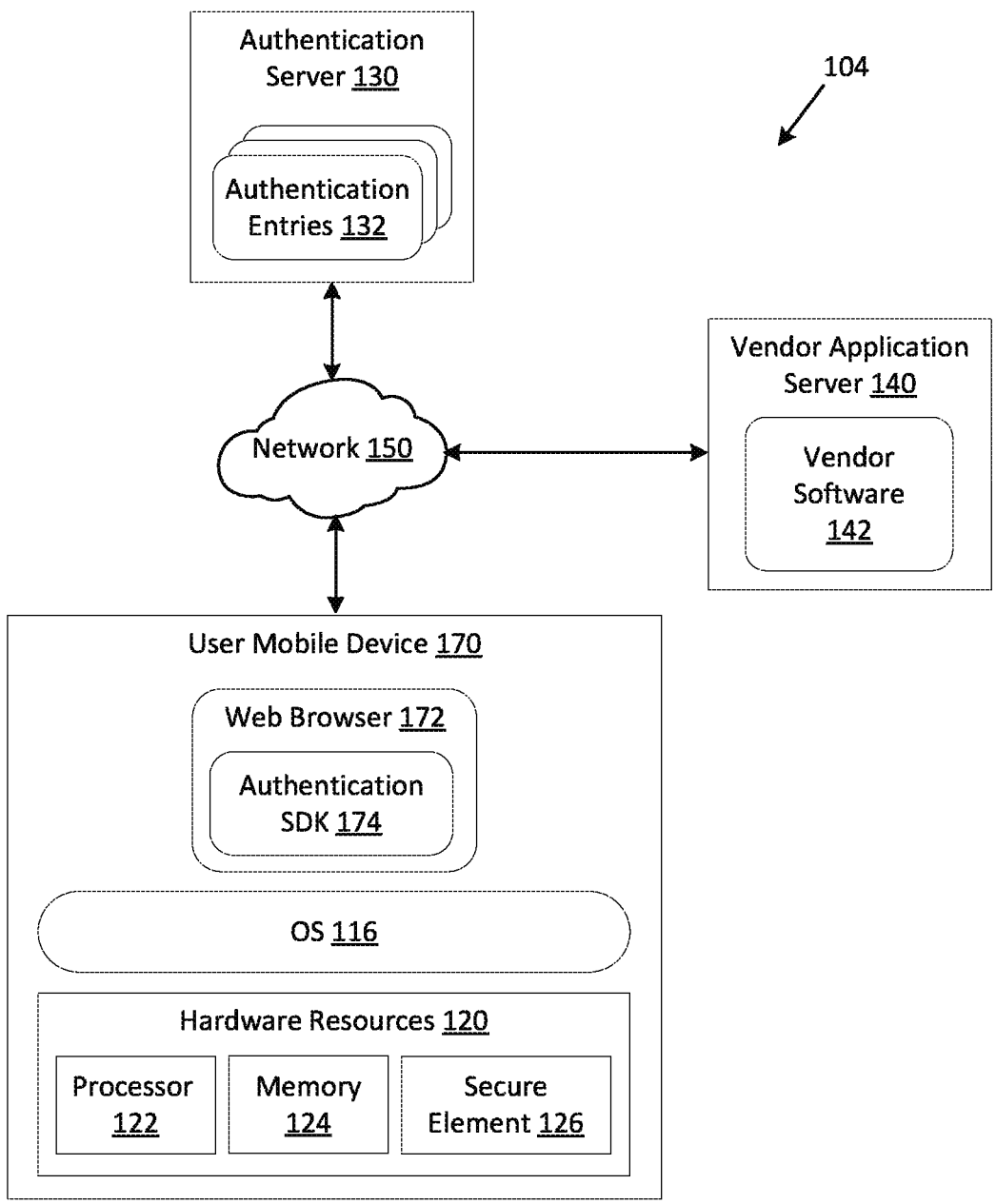
FIG. 1C is a block diagram of a wireless communication system that uses a cryptographic key or secure OTP to authenticate a user for a vendor, according to another embodiment.

FIG. 1C is a block diagram of a wireless communication system 104 that uses a cryptographic key or secure OTP to authenticate a user for a vendor, according to another embodiment. Wireless communication system 104 comprises a user mobile device 170, an authentication server 130, and a vendor application server 140 that communicate over a network 150.

Like user mobile device 110 from FIG. 1A, user mobile device 170 may be any mobile device that is configured to allow a user to wirelessly access network 150 and to practice one or more embodiments. User mobile device 170 may be, e.g., a cellphone, smartphone, PDA, tablet computer, or laptop computer.

However, unlike user mobile device 110 from FIG. 1A, user mobile device 170 has installed therein a web browser 172. Web browser 172 is a software that allows the user of user mobile device 170 to access network 150. In the embodiment of FIG. 1C, the user uses web browser 172 to interact with vendor software 142 instead of using a vendor application. For example, if vendor software 142 is a website provided by a bank, then the user interacts with the website via web browser 172.

Web browser 172 is embedded with an authentication SDK 174. Like vendor application 112 from FIG. 1A, web browser 172 uses its embedded SDK to perform authentication functions.

In wireless communication system 104, when the user enrolls his or her mobile device as a trusted device with vendor software 142, the resulting authentication entry 132 includes a push notification token that is mapped to web browser 172. As such, when the user attempts to log in to his or her account, if user mobile device 170 cannot be authenticated cryptographically, then authentication server 130 may transmit a secure OTP to web browser 172 as a push notification.

As shown by the embodiment of FIG. 1C, the user can receive a secure OTP as a push notification through a web browser to authenticate with vendor software 142. For example, the user can receive a secure OTP through the web browser to authenticate with his or her bank account.

Figure 2:
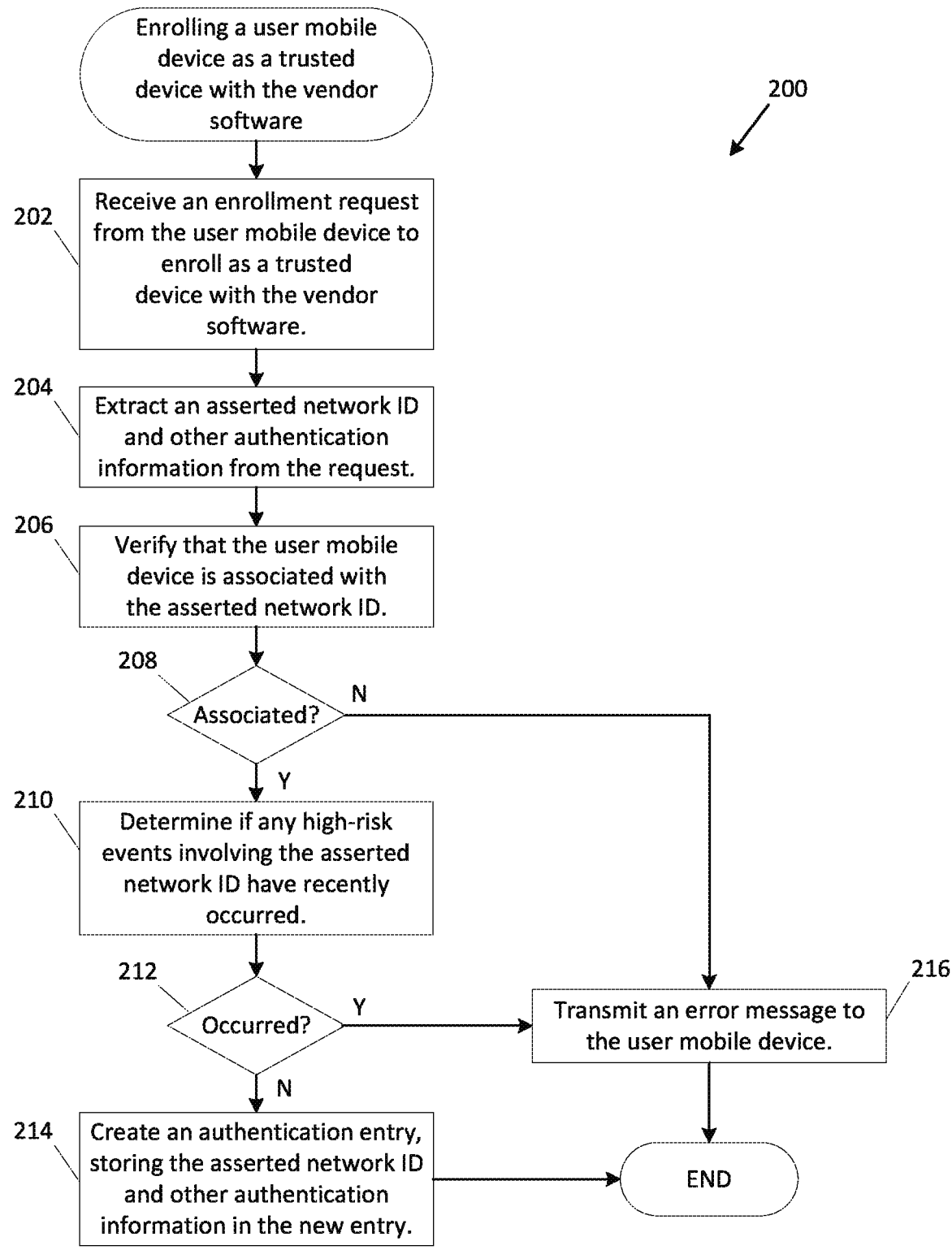
FIG. 2 is a flowchart of method steps for enrolling a computing device as a trusted device with a vendor software, according to one or more embodiments.

FIG. 2 is a flowchart of method steps for a method 200 of enrolling user mobile device 110 as a trusted device with vendor software 142, according to one or more embodiments. Although the method steps are described in conjunction with wireless communication system 100 of FIG. 1A, persons skilled in the art will understand that the method steps may be performed with other suitable systems, including wireless communication systems 102 and 104 of FIGS. 1B and 1C. The steps of method 200 are performed by authentication server 130. In other embodiments, the method steps can be performed by any other suitable computing device included in wireless communication system 100 or by a combination of multiple computing devices included in wireless communication system 100.

At step 202, authentication server 130 receives an enrollment request from user mobile device 110 to enroll as a trusted device with vendor software 142. At step 204, authentication server 130 extracts an asserted network ID and other authentication information from the enrollment request. The asserted network ID is a network ID that the user asserts to be associated with user mobile device 110. The authentication information includes, e.g., a push notification token and a cryptographic key.

At step 206, authentication server 130 verifies that user mobile device 110 is associated with the asserted network ID. Specifically, authentication server 130 analyzes a header of a data packet transmitted by user mobile device 110. However, if such a data packet is not available, authentication server 130 instead transmits an OTP as a text message to the asserted network ID for verification.

At step 208, if user mobile device 110 is associated with the asserted network ID, then method 200 moves to step 210. Otherwise, if user mobile device 110 is not associated with the asserted network ID, then method 200 moves to step 216.

At step 210, authentication server 130 determines if any high-risk events involving the asserted network ID have recently occurred. Such high-risk events may include, e.g., a change in the mobile device activated with the asserted network ID, a change in the SIM card associated with the asserted network ID, a change in a user name for a mobile account associated with the asserted network ID, a change in an address for such a mobile account, and a change in a number of identity verification queries that have been performed with respect to the asserted network ID.

At step 212, if a high-risk event has not recently occurred, then method 200 moves to step 214. Otherwise, if a high-risk event has recently occurred, then method 200 moves to step 216.

At step 214, because user mobile device 110 is associated with the asserted network ID and because no high-risk events have recently occurred, authentication server 130 enrolls user mobile device 110 as a trusted device with vendor software 142. Specifically, authentication server 130 creates an authentication entry 132 storing the asserted network ID and the other authentication information included in the enrollment request. After step 214, method 200 ends.

At step 216, because user mobile device 110 is not associated with the asserted network ID or because a high-risk event has recently occurred, authentication server 130 does not enroll user mobile device 110. Instead, authentication server 130 transmits an error message to user mobile device 110 indicating that enrollment failed. After step 216, method 200 ends.

Figure 3:
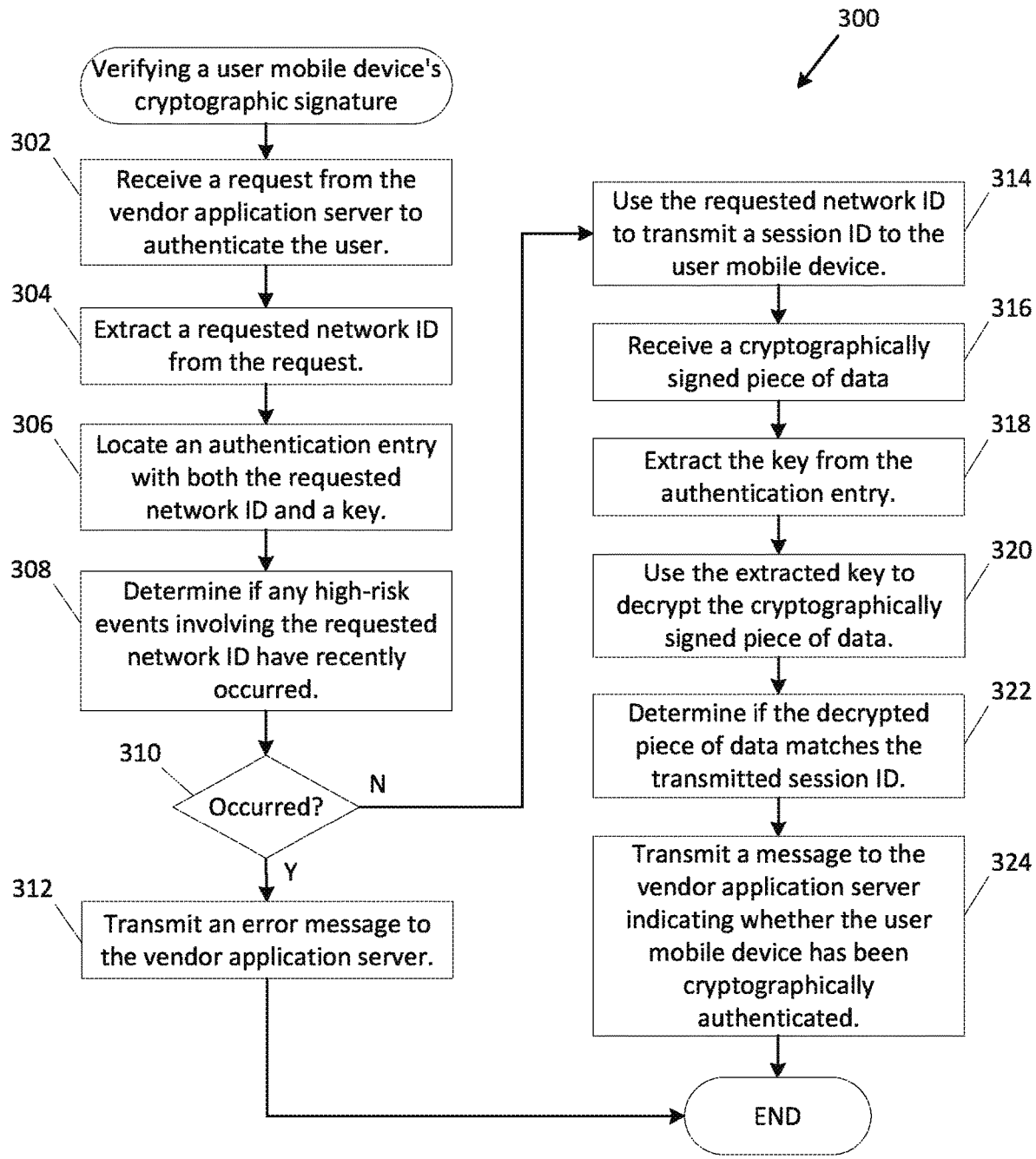
FIG. 3 is a flowchart of method steps for verifying the cryptographic signature of a trusted mobile device, according to one or more embodiments.

FIG. 3 is a flowchart of method steps for a method 300 of verifying the cryptographic signature of user mobile device 110 after enrollment as a trusted device with vendor software 142, according to one or more embodiments. Although the method steps are described in conjunction with wireless communication system 100 of FIG. 1A, persons skilled in the art will understand that the method steps may be performed with other suitable systems, including wireless communication systems 102 and 104 of FIGS. 1B and 1C. The steps of method 300 are performed by authentication server 130. In other embodiments, the method steps can be performed by any other suitable computing device included in wireless communication system 100 or by a combination of multiple computing devices included in wireless communication system 100.

At step 302, authentication server 130 receives a request from vendor application server 140 to authenticate the user. At step 304, authentication server 130 extracts a requested network ID from the request. The requested network ID is a network ID that corresponds to the user's account, e.g., the user's bank account.

At step 306, authentication server 130 locates an authentication entry 132 containing both the requested network ID and a cryptographic key. At step 308, authentication server 130 determines if any high-risk events involving the requested network ID have recently occurred. Such high-risk events may include, e.g., a change in the mobile device activated with the requested network ID, a change in the SIM card associated with the requested network ID, a change in a user name for a mobile account associated with the requested network ID, a change in an address for such a mobile account, and a change in a number of identity verification queries that have been performed with respect to the requested network ID.

At step 310, if a high-risk event has recently occurred, then method 300 moves to step 312. At step 312, authentication server 130 transmits an error message to vendor application server 140 indicating that the requested network ID may have been compromised. After step 312, method 300 ends.

At step 310, if a high-risk event has not recently occurred, then method 300 moves to step 314. At step 314, authentication server 130 begins attempting to cryptographically authenticate user mobile device 110. Authentication server 130 begins by using the requested network ID to transmit a session ID to user mobile device 110, e.g., as a text message. The session ID can be any piece of data, the significance of the session ID being to verify if user mobile device 110 can sign the session ID using the cryptographic key corresponding to the cryptographic key located at step 306. For example, if the key located in step 306 is a public key of a key pair, then the corresponding cryptographic key is a private key stored in secure element 126.

At step 316, authentication server 130 receives a cryptographically signed piece of data from user mobile device 110. At step 318, authentication server 130 extracts the cryptographic key located in step 306 from the authentication entry 132.

At step 320, authentication server 130 uses the extracted key to decrypt the cryptographically signed piece of data. At step 322, authentication server 130 determines whether the decrypted piece of data matches the session ID transmitted at step 314. If there is a match, then user mobile device 110 must contain a cryptographic key corresponding to the key located at step 306.

At step 324, authentication server 130 transmits a message to vendor application server 140 indicating whether or not user mobile device 110 has been cryptographically authenticated. If the decrypted piece of data matched the transmitted session ID, then user mobile device 110 has been cryptographically authenticated, and a secure OTP is not necessary for authentication. Otherwise, if the decrypted piece of data did not match the session ID, then user mobile device 110 has not been cryptographically authenticated, and a secure OTP is necessary. Authenticating a user with a secure OTP is discussed in conjunction with FIG. 4. After step 324, method 300 ends.

Figure 4:
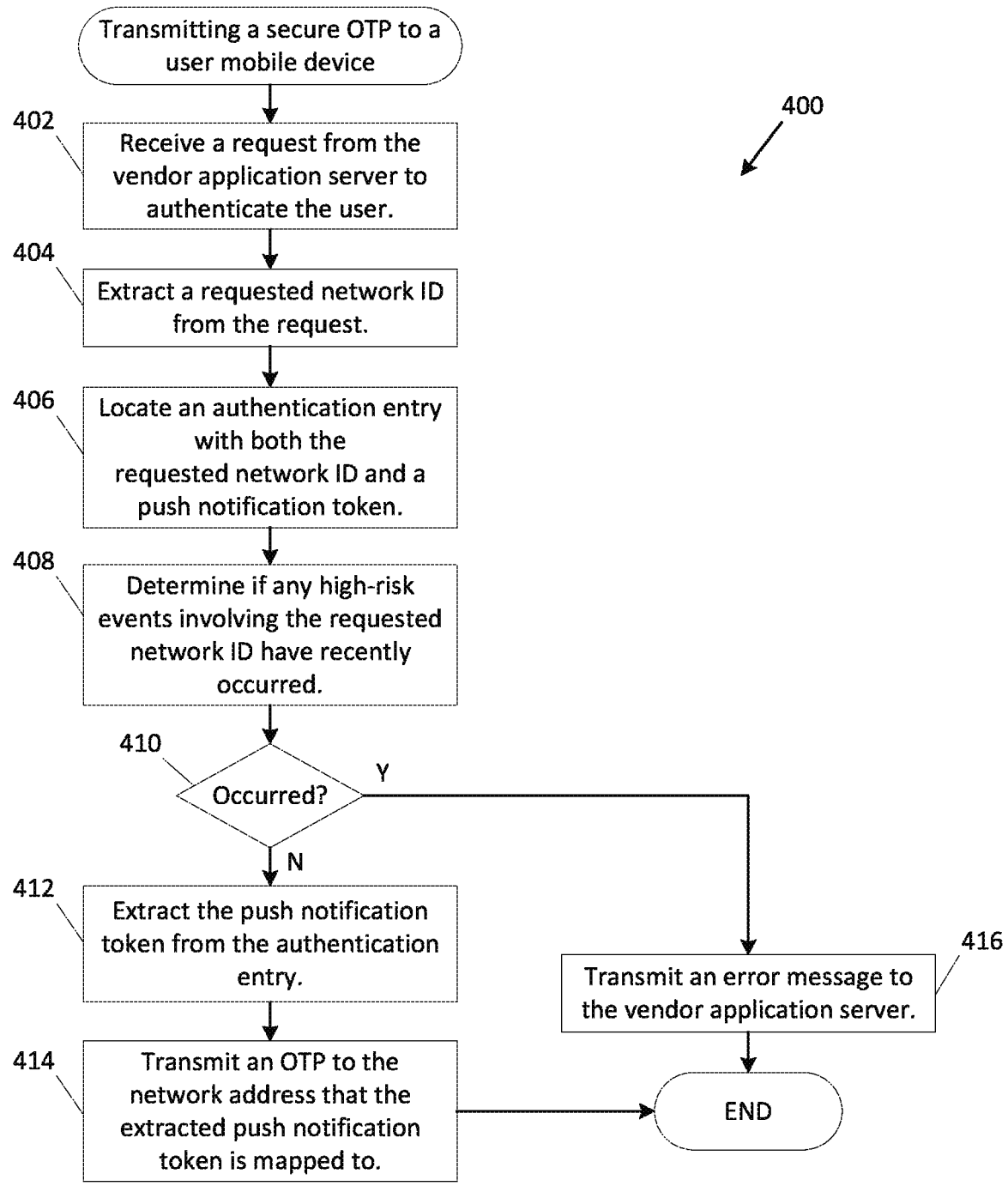
FIG. 4 is a flowchart of method steps for transmitting a secure OTP to a trusted mobile device, according to one or more embodiments.

FIG. 4 is a flowchart of method steps for a method 400 of transmitting a secure OTP to user mobile device 110 after enrollment as a trusted device with vendor software 142, according to one or more embodiments. Although the method steps are described in conjunction with wireless communication system 100 of FIG. 1A, persons skilled in the art will understand that the method steps may be performed with other suitable systems, including wireless communication systems 102 and 104 of FIGS. 1B and 1C. The steps of method 400 are performed by authentication server 130. In other embodiments, the method steps can be performed by any other suitable computing device included in wireless communication system 100 or by a combination of multiple computing devices included in wireless communication system 100. Authentication server 130 may perform method 400, e.g., when cryptographic verification is unavailable or has failed.

At step 402, authentication server 130 receives a request from vendor application server 140 to authenticate the user. At step 404, authentication server 130 extracts a requested network ID from the request. The requested network ID is a network ID that corresponds to the user's account, e.g., the user's bank account.

At step 406, authentication server 130 locates an authentication entry 132 containing both the requested network ID and a push notification token. At step 408, authentication server 130 determines if any high-risk events involving the requested network ID have recently occurred. Such high-risk events may include, e.g., a change in the mobile device activated with the requested network ID, a change in the SIM card associated with the requested network ID, a change in a user name for a mobile account associated with the requested network ID, a change in an address for such a mobile account, and a change in a number of identity verification queries that have been performed with respect to the requested network ID.

At step 410, if a high-risk event has not recently occurred, then method 400 moves to step 412. At step 412, authentication server 130 extracts the push notification token from authentication entry 132. At step 414, authentication server 130 transmits an OTP to the network address that the extracted push notification token is mapped to. After step 414, method 400 ends. If the user receives the transmitted OTP as a push notification, the user may enter the OTP, e.g., through a UI of vendor application 112. Entering the OTP proves ownership of a trusted device, and vendor application server 140 may allow for access to the user's account.

At step 410, if a high-risk event has recently occurred, then method 400 moves to step 416. At step 416, authentication server 130 transmits an error message to vendor application server 140 indicating that the requested network ID may have been compromised. After step 416, method 400 ends.

In sum, embodiments described herein enable a user to securely log in to an account without an OTP being transmitted to the user's network ID. Firstly, the embodiments provide for cryptographically verifying ownership of a trusted device. Secondly, the embodiments provide for transmitting an OTP as a push notification to a trusted device to prove ownership. Thus, the embodiments provide a technical advancement that leads to enhancing security and reducing fraud.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data that can thereafter be input into a computer system. Computer readable media may be based on any existing or subsequently developed technology that embodies computer programs in a manner that enables a computer to read the programs. Examples of computer readable media are HDDs, SSDs, network-attached storage (NAS) systems, read-only memory (ROM), RAM, compact disks (CDs), digital versatile disks (DVDs), magnetic tapes, and other optical and non-optical data storage devices. A computer readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

We claim:

1. A computer-implemented method of authenticating a mobile device to allow for secure login to a vendor software, comprising:
   receiving a request to enroll the mobile device as a trusted device with the vendor software, the request to enroll the mobile device including a first network identifier (ID) and other authentication information;
   in response to receiving the request to enroll the mobile device, determining that a high-risk event involving the first network ID has not occurred, and determining that the first network ID is associated with the mobile device;
   in response to determining that the high-risk event involving the first network ID has not occurred and determining that the first network ID is associated with the mobile device, enrolling the mobile device as a trusted device with the vendor software by storing the first network ID and the other authentication information;
   after enrolling the mobile device, receiving a request to authenticate the mobile device, the request to authenticate the mobile device including a second network ID;
   in response to receiving the request to authenticate the mobile device, comparing the first network ID to the second network ID; and
   in response to determining that the first network ID matches the second network ID, using the other authentication information to authenticate the mobile device as a trusted device that is permitted to log in to the vendor software.

2. The computer-implemented method of claim 1, wherein the other authentication information includes a push notification token, and authenticating the mobile device as a trusted device comprises using the push notification token to transmit a one-time passcode (OTP) to the mobile device as a push notification.

3. The computer-implemented method of claim 2, wherein the push notification token is mapped to an authentication application installed on the mobile device.

4. The computer-implemented method of claim 3, wherein the authentication application is a vendor application that facilitates access to and interactions with the vendor software.

5. The computer-implemented method of claim 2, wherein the push notification token is mapped to a web browser installed on the mobile device.

6. The computer-implemented method of claim 1, wherein determining that the first network ID is associated with the mobile device involves analyzing a header of at least one data packet transmitted by the mobile device.

7. The computer-implemented method of claim 1, further comprising:
   in response to receiving the request to authenticate the mobile device, determining that a high-risk event involving the second network ID has not occurred.

8. The computer-implemented method of claim 1, wherein the other authentication information includes a cryptographic key, and wherein authenticating the mobile device as a trusted device includes:
   transmitting a session ID to the mobile device,
   receiving encrypted data from the mobile device, and
   determining by using the cryptographic key to decrypt the encrypted data, that the encrypted data was transmitted by the mobile device.

9. A restricted-access system of computing devices, comprising:
- a mobile device;
- a vendor server hosting a vendor software; and
- an authentication server configured to:
    - receive a request to enroll the mobile device as a trusted device with the vendor software, the request to enroll the mobile device including a first network identifier (ID) and other authentication information;
    - in response to receiving the request to enroll the mobile device, determine that a high-risk event involving the first network ID has not occurred, and determine that the first network ID is associated with the mobile device;
    - in response to determining that the high-risk event involving the first network ID has not occurred and determining that the first network ID is associated with the mobile device, enroll the mobile device as a trusted device with the vendor software by storing the first network ID and the other authentication information;
    - after enrolling the mobile device, receive a request to authenticate the mobile device, the request to authenticate the mobile device including a second network ID;
    - in response to receiving the request to authenticate the mobile device, compare the first network ID to the second network ID; and
    - in response to determining that the first network ID matches the second network ID, use the other authentication information to authenticate the mobile device as a trusted device that is permitted to loci in to the vendor software.

10. The restricted-access system of computing devices of claim 9, wherein the other authentication information includes a push notification token, and authenticating the mobile device as a trusted device comprises using the push notification token to transmit a one-time passcode (OTP) to the mobile device as a push notification.

11. The restricted-access system of computing devices of claim 10, wherein the push notification token is mapped to an authentication application installed on the mobile device.

12. The restricted-access system of computing devices of claim 11, wherein the authentication application is a vendor application that facilitates access to and interactions with the vendor software.

13. The restricted-access system of computing devices of claim 10, wherein the push notification token is mapped to a web browser installed on the mobile device.

14. The restricted-access system of computing devices of claim 9, wherein determining that the first network ID is associated with the mobile device involves analyzing a header of at least one data packet transmitted by the mobile device.

15. The restricted-access system of computing devices of claim 9, wherein the authentication server is further configured to:
- in response to receiving the request to authenticate the mobile device, determine that a high-risk event involving the second network ID has not occurred.

16. The restricted-access system of computing devices of claim 9, wherein the other authentication information includes a cryptographic key, and wherein authenticating the mobile device as a trusted device includes:
- transmitting a session ID to the mobile device,
- receiving encrypted data from the mobile device, and
- determining by using the cryptographic key to decrypt the encrypted data, that the encrypted data was transmitted by the mobile device.

17. A computer-implemented method of authenticating a mobile device to allow for secure login to a vendor software, comprising:
- receiving a request to enroll the mobile device as a trusted device with the vendor software, the request to enroll the mobile device including a first network identifier (ID) and other authentication information;
- in response to receiving the request to enroll the mobile device, determining that a high-risk event involving the first network ID has not occurred, and determining that the first network ID is associated with the mobile device;
- in response to determining that the high-risk event involving the first network ID has not occurred and determining that the first network ID is associated with the mobile device, enrolling the mobile device as a trusted device with the vendor software by storing the first network ID and the other authentication information;
- after enrolling the mobile device, receiving a request to authenticate the mobile device, the request to authenticate the mobile device including a second network ID;
- in response to receiving the request to authenticate the mobile device, determining that a high-risk event involving the second network ID has not occurred, and comparing the first network ID to the second network ID; and
- in response to determining that the high-risk event involving the second network ID has not occurred and determining that the first network ID matches the second network ID, using the other authentication information to authenticate the mobile device as a trusted device that is permitted to log in to the vendor software.

18. The computer-implemented method of claim 17, wherein the other authentication information includes a push notification token, and authenticating the mobile device as a trusted device comprises using the push notification token to transmit a one-time passcode (OTP) to the mobile device as a push notification.

19. The computer-implemented method of claim 17, wherein determining that the first network ID is associated with the mobile device involves analyzing a header of at least one data packet transmitted by the mobile device.

20. The computer-implemented method of claim 17, wherein the other authentication information includes a cryptographic key, and wherein authenticating the mobile device as a trusted device includes:
- transmitting a session ID to the mobile device,
- receiving encrypted data from the mobile device, and
- determining by using the cryptographic key to decrypt the encrypted data, that the encrypted data was transmitted by the mobile device.

* * * * *

UNITED STATES PATENT AND TRADEMARK OFFICE
CERTIFICATE OF CORRECTION

| | |
|---|---|
| PATENT NO. | : 11,689,923 B2 |
| APPLICATION NO. | : 17/141643 |
| DATED | : January 5, 2021 |
| INVENTOR(S) | : Chirag C. Bakshi et al. |

It is certified that error appears in the above-identified patent and that said Letters Patent is hereby corrected as shown below:

On the Title Page (*) Notice, delete "This patent is subject to a terminal disclaimer."

Signed and Sealed this
Seventeenth Day of October, 2023

Katherine Kelly Vidal
*Director of the United States Patent and Trademark Office*